(12) United States Patent
Wu et al.

(10) Patent No.: US 7,949,190 B2
(45) Date of Patent: May 24, 2011

(54) REAL-TIME NIGHTTIME VEHICLE DETECTION AND RECOGNITION SYSTEM BASED ON COMPUTER VISION

(75) Inventors: Bing-Fei Wu, Hsinchu (TW); Yen-Lin Chen, Kaohsiung (TW); Yuan-Hsin Chen, Taichung (TW); Chao-Jung Chen, Taipei (TW)

(73) Assignee: National Chiao Tung University, Hsinchu (TW)

( * ) Notice: Subject to any disclaimer, the term of this patent is extended or adjusted under 35 U.S.C. 154(b) by 947 days.

(21) Appl. No.: 11/500,141

(22) Filed: Aug. 7, 2006

(65) Prior Publication Data
US 2007/0263901 A1 Nov. 15, 2007

(30) Foreign Application Priority Data
May 12, 2006 (TW) .................. 95116809 A (51) Int. Cl.
*G06K 9/52* (2006.01)
(52) U.S. Cl. ......... 382/206; 382/103; 382/104; 382/174
(58) Field of Classification Search .................. 382/103, 382/104, 153, 174, 206
See application file for complete search history.

(56) References Cited

U.S. PATENT DOCUMENTS

| | | | |
|---|---|---|---|
| 5,809,161 A * | 9/1998 | Auty et al. .................... 382/104 |
| 5,837,994 A | 11/1998 | Stam et al. | |
| 5,999,877 A * | 12/1999 | Takahashi et al. ............ 701/117 |
| 6,587,573 B1 * | 7/2003 | Stam et al. .................... 382/104 |
| 6,611,610 B1 * | 8/2003 | Stam et al. .................... 382/104 |
| 6,789,015 B2 * | 9/2004 | Tsuji et al. .................... 701/301 |
| 6,861,809 B2 | 3/2005 | Stam | |
| 6,868,322 B2 | 3/2005 | Stam et al. | |
| 6,873,286 B2 * | 3/2005 | Albero et al. .................. 342/71 |
| 6,873,912 B2 * | 3/2005 | Shimomura .................. 701/301 |
| 7,046,822 B1 * | 5/2006 | Knoeppel et al. ............ 382/103 |
| 7,460,691 B2 * | 12/2008 | Ng et al. ........................ 382/107 |
| 2008/0253616 A1 * | 10/2008 | Mizuno et al. ................ 382/105 |

FOREIGN PATENT DOCUMENTS

| | | |
|---|---|---|
| TW | 00328413 | 3/1998 |
| TW | 00569981 | 1/2004 |
| TW | M250832 | 11/2004 |
| WO | WO 0077736 A1 * | 12/2000 |

* cited by examiner

*Primary Examiner* — Matthew C Bella
*Assistant Examiner* — Dennis Rosario
(74) *Attorney, Agent, or Firm* — Bucknam and Archer (57) ABSTRACT

The present invention relates to a real-time nighttime vehicle detection and identification system comprises an illuminant object image segmentation device 1, an illuminant object classifying device 2, a vehicle lighting object identification device 3, a vehicle position determining device 4 and a vehicle tracking device 5. Under various circumstances of road lighting during nighttime, the system can efficiently and accurately demarcate and identify the lamps of oncoming and preceding vehicles and accurately provides the driver with auxiliary information needed to analyze the traffic conditions in front of the vehicle during the conditions met on the road at that time.

16 Claims, 8 Drawing Sheets

REAL-TIME NIGHTTIME VEHICLE DETECTION AND RECOGNITION SYSTEM BASED ON COMPUTER VISION

DESCRIPTION OF INVENTION

1. Field of the Invention

The present invention relates to an intelligent real-time nighttime vehicle detection and identification system based on computer vision.

2. Background of the Invention

During movement of a vehicle at nighttime, the driver can obtain the traffic condition of the preceding vehicles by his vision under the illumination of the headlamps, the traffic condition including the number of the preceding vehicles, relative positions of the preceding vehicles and distances with respect to the preceding vehicles. The traffic condition of the oncoming vehicles can be determined based on the illumination of headlamps of the oncoming vehicles. Depending on the road condition during the nighttime, the driver uses a high beam or a low beam so as to extend his vision to different distances. In the case that an oncoming vehicle presents at a shorter distance, the use of the high beam would dazzle the driver of the oncoming vehicle. Since traditional vehicle system is unable to detect traffic conditions at a certain distance and hence make automatic switching between the high beam and the low beam, the driver may be dazzled by the high beam of the oncoming vehicle. It may be dangerous for a moving vehicle.

There is a demand of an operating mechanism which is capable of making automatic switching between the high beam and the low beam. For the time being, various technologies by which such automatic switching can be implemented are proposed. Most of the systems adopts ultrasound or vehicle radar to detect the distance from the oncoming vehicle. However, the systems adopting ultrasound or vehicle radar are costly.

As disclosed in Taiwanese Patent No. 569981, M250832 and 328413, a photo sensor is mounted on the front end of the vehicle. The photo sensor is mainly formed of a photodiode, for sensing the light of the lamps in front of the vehicle. During movement of the vehicle at nighttime, if the intensity of the light from the lamps in front of the vehicle exceeds a threshold value, the photo sensor immediately issue a signal. Based on the signal, the situation that a vehicle presents ahead is determined, and automatic switching between the high beam and the low beam is triggered. Whether a vehicle present ahead is determined based on the presence of the light which is detected by the photodiode. An erroneous determination is possible because the photodiode is unable to distinguish the light of the vehicle from the ambient light sources, the shining signboard and the like.

Moreover, as disclosed in prior arts such as U.S. Pat. No. 5,837,994, U.S. Pat. No. 6,861,809 and U.S. Pat. No. 6,868,322, a photo sensor array is mounted to the front end of the vehicle. During movement of the vehicle at nighttime, the image of the field of view in front of the vehicle is acquired and digitalized into a light level array. Then, a plurality of predetermined threshold values are used. Pixels having light level higher than a certain threshold value is acquired and labeled. Subsequently, by use of another threshold value, whether the detected light is a light of an oncoming vehicle, a reflective glare of vehicle lamps or an ambient light source other than light of the vehicle. By use of the photo sensor array, each bright area acquired by the photo sensor array is analyzed by comparison with a series of the threshold values, and hence whether the detected light is a light of a vehicle is determined. Therefore, probability of an erroneous determination is greatly reduced. The prior arts are capable of identifying an approaching oncoming vehicle and a preceding vehicle moving on the same lane but are unable to further determine relative distances with respect to the identified oncoming vehicle and the preceding vehicle for a detailed traffic condition. Since the predetermined threshold values which are unvarying are used, the prior arts are unable to adaptively adjust the threshold valves depending on the illumination condition in the nighttime. Once the prior arts are applied under different illumination condition, a constant performance may be unreachable.

SUMMARY OF THE INVENTION

In the light of the issues mentioned above, the present invention proposes a perspective imaging model based on a CCD image acquiring technology and computer vision for determining the presence of an oncoming vehicle and a distance from the later in the nighttime. The determination of the present invention is made by a high speed computer vision algorithm method, which can greatly reduce the cost of implementation of the operating mechanism. At the same time, a solution which is reliable, inexpensive and high performance.

The present invention proposes a system for detecting and identifying vehicles in real-time at nighttime, the system including:

an illuminant object image segmentation device for segmenting illuminant objects from images in front of a host vehicle; an illuminant object classification device for classifying the illuminant objects segmented from the images by a connected object demarcation unit so as to generalize spatial characteristics of correlation between the illuminant objects as illuminant object groups; a vehicle-light object identification device for gaining spatial characteristic information of each vehicle from the illuminant object groups by a pattern analyzing unit; a vehicle position determining device for gaining relative position information between each target vehicle that appears ahead on the road and the host vehicle from the spatial characteristic information by a distance estimation unit; and a vehicle tracking device for detecting a vehicle's moving direction in accordance with a vehicle-light group targeted from each continued image frames based on the position information after gaining the illuminant object groups, so as to determine a movement information of each vehicle that enters an area under surveillance.

The position information at least includes the relative distance from and position of a detected target vehicle on the lane. The movement information at least includes the direction of the relative movement and the relative velocity of each vehicle. The connected object demarcation unit is used in the demarcation of each illuminant object for analyzing characteristics of object size, ratio and distance based on projection-profile analysis.

The pattern analyzing unit determines whether the demarcated illuminant object group has characteristics of a vehicle light and determine whether the vehicle light is a headlamp or a tail lamp. The associated device is a switch controller for switching between the high beam and the low beam. The distance estimation unit estimates a depth of field of the target vehicle at a certain time point corresponding to a coordinate system of a real space. Based on the information including the pixel coordinate position and the depth of field of the target vehicle in the image, the distance from the vehicle on the lane, the position of a left edge and the position of a right edge of the vehicle is derived.

As mentioned above, the real-time nighttime vehicle detection and identification system of the present invention accurately detects traffic conditions in the field of view ahead of the vehicle and identify the headlamp of the oncoming vehicle and the tail lamp of the preceding vehicle by a CCD video acquiring system installed at the back of the windshield so as to determine the relative positions and number of the preceding and oncoming vehicles, assist the driver to determine traffic conditions and automatically control the associated device (for example device for switching between high beam and low beam).

In addition, the present invention provides a method for detecting and identifying vehicle in real-time at nighttime, the method includes the following steps:

step of illuminant object image segmentation, segmenting illuminant objects from images in front of a host vehicle;

step of illuminant object classification classifying the illuminant objects segmented from the image by a connected object demarcation unit so as to generalize spatial characteristic of correlation between the illuminant objects as illuminant object groups;

step of vehicle-light object identification, gaining spatial characteristic information of each vehicle from the said illuminant object groups by a pattern analyzing unit;

step of vehicle position determination, gaining relative position information between each target vehicle that appears ahead on the road and the host vehicle from the spatial characteristic information by a distance estimation unit; and step of vehicle tracking, for detecting a vehicle's moving direction in accordance with a vehicle-light group targeted from each continued image frames based on the relative position information after gaining the illuminant object groups, so as to determine a movement information of each vehicle that enters an area under surveillance.

The advantages of the system and methods of the present invention include: efficient and accurate demarcation and detection of the vehicle light of oncoming and preceding vehicles on the road under various illumination conditions on the road at nighttime; and provision of accurate information for assistance to the driver in obtaining traffic conditions in front of the vehicle. This nighttime vehicle detection and identification system may be applied to controlling of the high beam and the low beam. Based on the detection and determination of the traffic conditions, automatic switching between the high beam and the low beam is made in an optimum manner. If the presence of a vehicles is detected, then the headlamp is switched to the low beam to prevent dazzling the driver of the oncoming vehicle and thus prevent the traffic accident from occurring. In the case of absentation of the oncoming or preceding vehicle, the headlamp is switched to the high beam so as to extend the driver's vision.

DETAILED DESCRIPTION OF PREFERRED EMBODIMENTS OF THE INVENTION

The preferred embodiments of the real-time nighttime vehicle detection and identification system of the present invention and its method is described in conjunction with the accompanying drawings.

Figure 1:
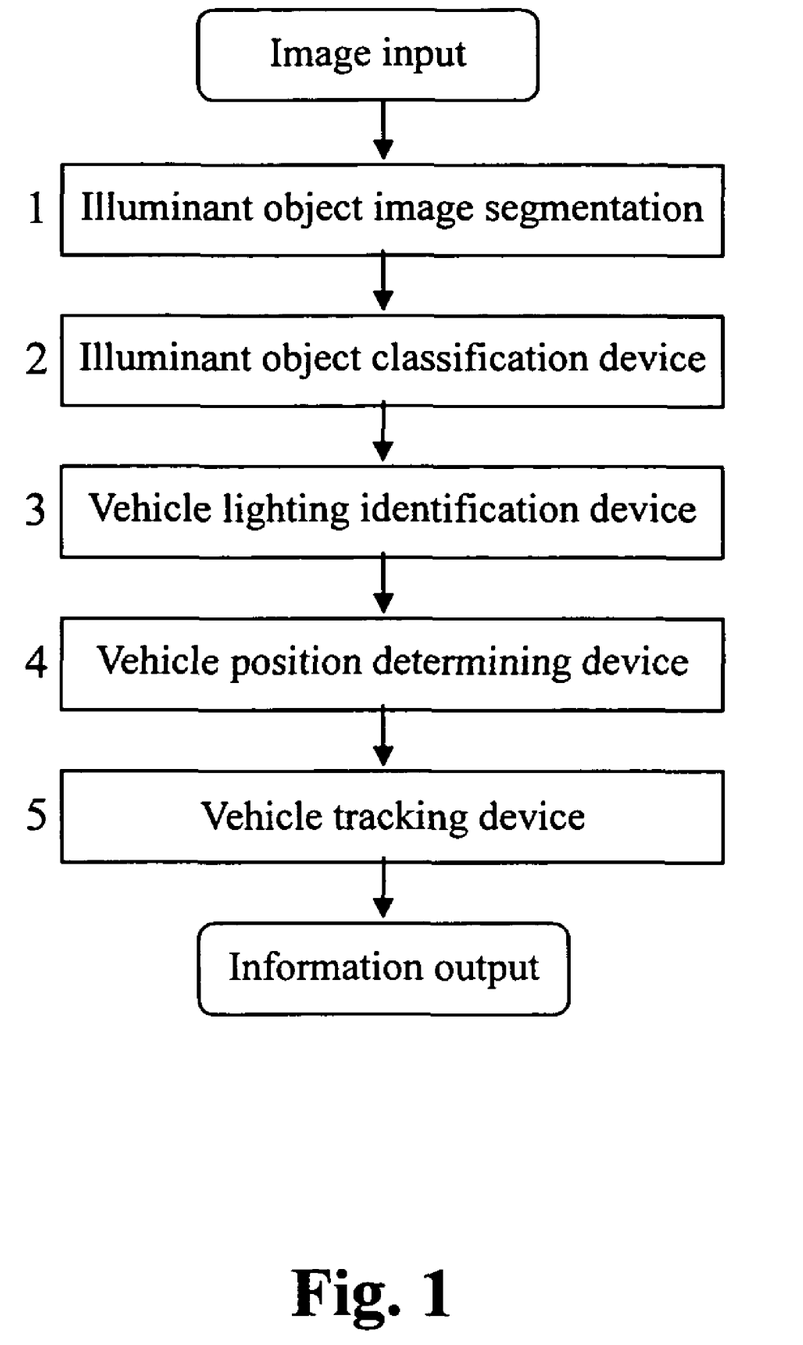
FIG. 1 shows the framework of the overall processing operations.

The real-time nighttime vehicle detection and identification system of the present invention comprises: an illuminant object image segmentation device 1, an illuminant object classification device 2, a vehicle lighting object identification device 3, a vehicle position determining device 4 and a vehicle tracking device 5 as shown in FIG. 1.

Figure 2:
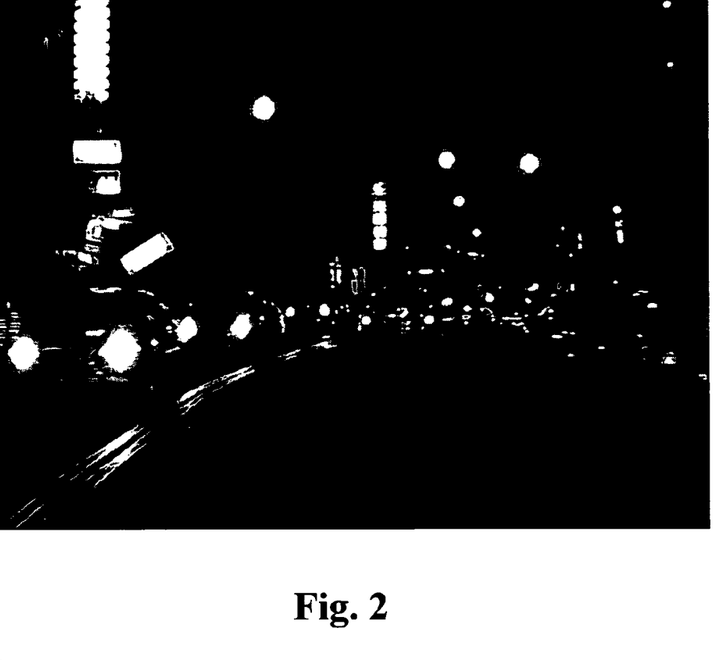
FIG. 2 shows the image of the road condition acquired at nighttime by the CCD video camera.
Figure 9:
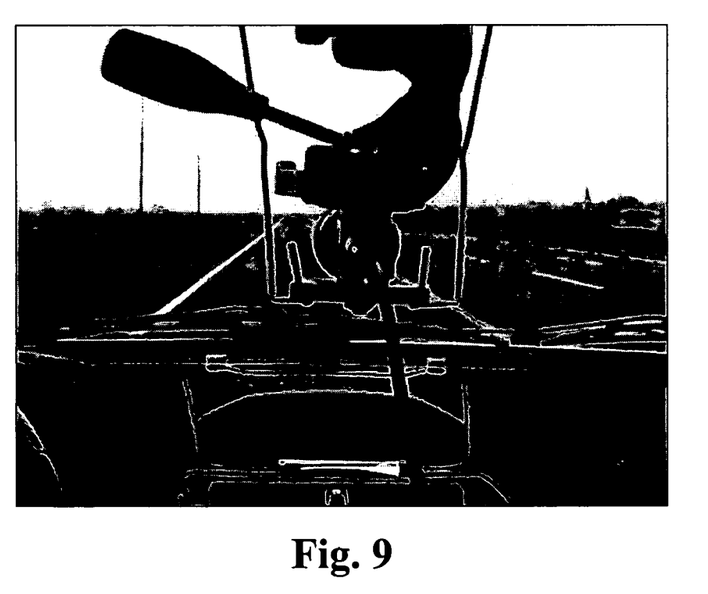
FIG. 9 shows that the CCD video camera installed in the host vehicle at the back of the windshield.

First of all, a video camera is installed at the back of the windshield inside the vehicle for acquiring the image of the front of the vehicle (as shown in FIG. 9). During driving at nighttime, the image of the nighttime road condition in front of the vehicle is acquired through the video camera, as shown in FIG. 2. The image is then analyzed and processed as explained below.

Subsequently, the image of the road condition in front of the vehicle is analyzed by the illuminant object image segmentation technology. The segmentation technology is a high speed image segmentation technology which determines multiple segment threshold values based on statistical image analysis and captures the brightest object plane.

The concept of statistics, classification and determination is applied on the image segmentation from the research of N.otsu et al ("A threshold selection method from gray-level histograms", IEEE Transactions on System Man and Cybernetics, vol. SMC-8, pp. 62-66, 1978.), which defines an optimum threshold by which the image element of the whole image is divided into two classes, i.e. a foreground and a background, the threshold maximizing the "between-class variance" of the pixel set of this two classes maximum.

With regard to the concerned road image of nighttime, the bright object is a main target for segmentation analysis. The method of multiple threshold automatic image segmentation of the present invention comprises following steps.

Step (1): at the beginning of the process, all of the pixels are generalized into an initial pixel class Co, q represents the number of pixel classes which exist in the current iteration, therefore the initial value is 1.

Step (2): at the beginning of the current iteration, q pixel classes are determined in the last iteration; statistical characteristics, progressive probability function $w_n$, mean $\mu_n$ and standard deviation $\sigma_n$ are calculated for each pixel class $C_n$.

Step (3): from the currently determined pixel class, the pixel class of highest contribution value in the between-class variance $w_n \sigma_n^2$ is found out; this pixel class which is found out is represented by $C_p$, which will be taken as an object of binary segmentation in the next step.

Step (4): using the optimum threshold $t_s^*$, the pixel class $C_p$ is segmented into two subclasses $C_{p0}$ and $C_{p1}$ which are the subsets that branched out from $C_p$ and can be represented as $C_{p0}$: $\{t_p+1, t_p+2, \ldots t_s^*\}$ and $C_{p1}$: $\{t_s^*+1, t_s^*+2, \ldots, t_{p+1}\}$; the optimum threshold $t_s^*$ is derived from the between-class variance $v_{BC}$ as a result of maximization segmentation; the optimum threshold $t_s^*$ is obtained from the following formulas:

$$t_s^* = \underset{t_p > t_s > t_{p+1}}{\text{Arg Max}} \; v'_{BC}(t_s), \quad (1)$$

$$v'_{BC} = w_{p0}(\mu_{p0} - \mu_p)^2 + w_{p1}(\mu_{p1} - \mu_p)^2, \quad (2)$$

$$w_{p0} = \sum_{i=t_p+1}^{t_s} P_i, \; w_{p1} = \sum_{i=t_s+1}^{t_{p+1}} P_i \quad (3)$$

$$\mu_{p0} = \sum_{i=t_p+1}^{t_s} iP_i/w_{p0}, \; \mu_{p1} = \sum_{t_s+1}^{t_{p+1}} iP_i/w_{p1} \quad (4)$$

$$w_p = \sum_{t_p+1}^{t_{p+1}} P_i, \; \mu_p = \sum_{i=t_p+1}^{t_{p+1}} iP_i/w_p \quad (5)$$

wherein $w_p$ and $\mu_p$ are respectively the progressive probability and mean of the pixel gray scale in $C_p$.

Step (5): after executing the step (4), q+1 pixel classes are obtained; then, the following formula is used to calculate the differential value of SF degree of dissociation of the segmentation result:

$$SF = \frac{v_{BC}(T)}{v_T} = 1 - \frac{v_{WC}(T)}{v_T} \quad (6)$$

If $SF<TH_{SF}$ ($TH_{SF}$ is the default target value, in the this embodiment $TH_{SF}=0.9$), it implies that there still has homogenous object which had not yet been segmented, and the step (2) is repeated for the next iteration procedure, or else, entering the step (6).

Step (6): according to the threshold sets determined finally, the pixels of the image are separately generalized into the corresponding pixel class, whereby separating each homogenous object and finishing the segmentation process.

In the present embodiment, $TH_{SF}$ is set as 0.9 which is determined by experimentations on a large quantity of various images and is capable of optimizing segmentation.

Figure 3:
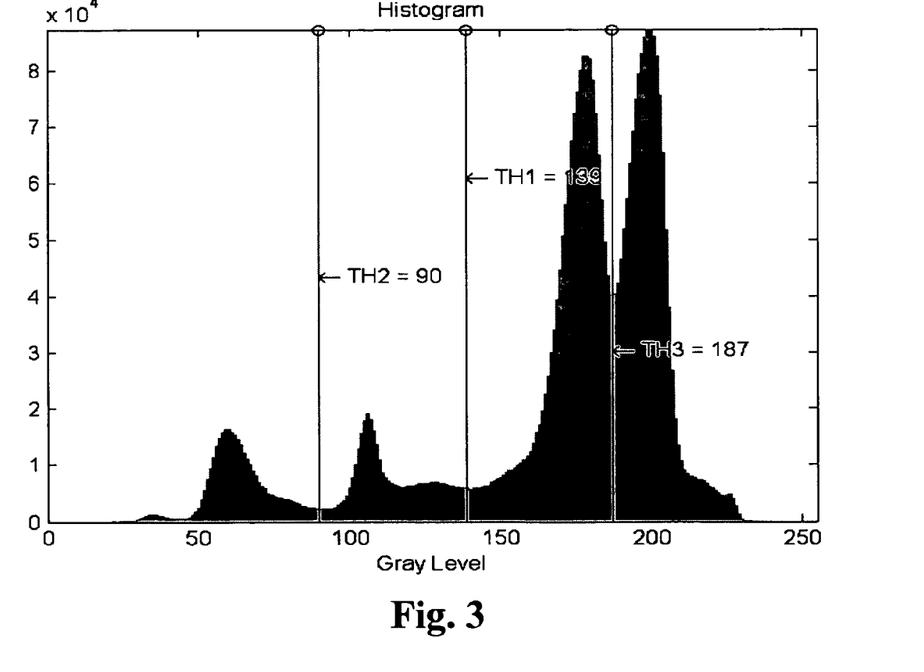
FIG. 3 a statistical graph regarding the gray level for the image shown in FIG. 2.
Figure 4:
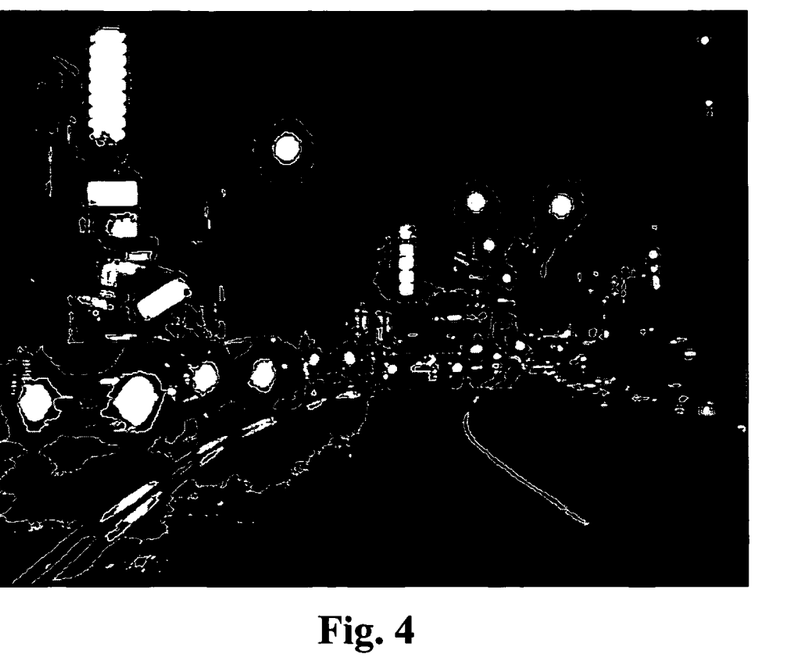
FIG. 4 shows the image which is processed by the automatic segmentation algorithm.
Figure 5:
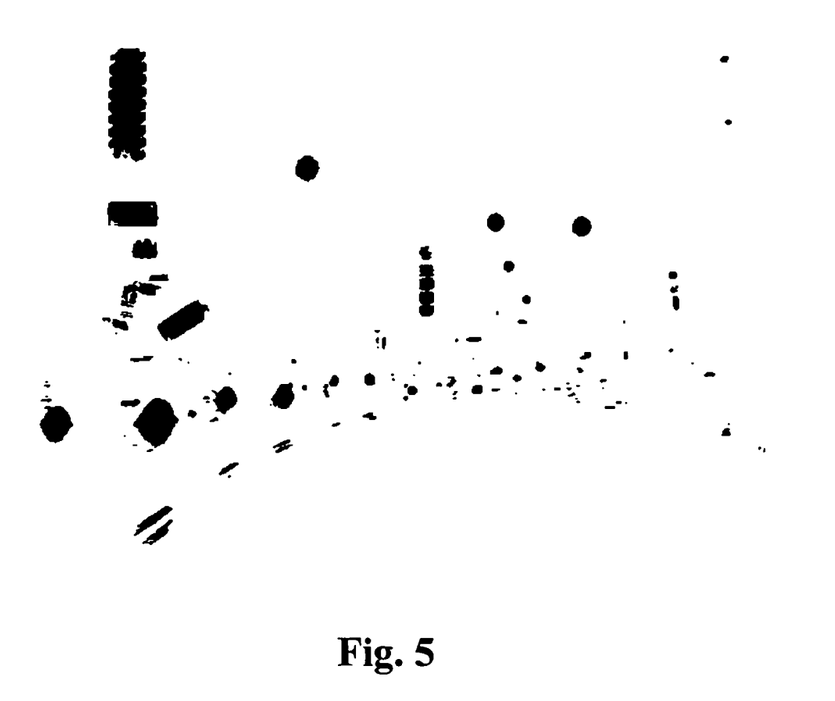
FIG. 5 shows the image of the illuminant object plane after binary conversion.

The process and result of the segmentation technology is described with reference to the illuminant object image segmentation illustrated in FIG. 2. As seen in FIG. 2, the bright illuminant objects in a typical nighttime road condition include vehicle lights, reflection of the vehicle lights in the road, street lights, traffic signals, neon lights. By means of the calculation mentioned above, statistical analysis for the pixels is shown in FIG. 3. After executing the image segmentation mentioned above, three optimum segmentation thresholds by which the pixels are divided into four pixel groups are obtained. The brightest pixel group composed of illuminant objects in nighttime road conditions is located at the right of FIG. 3. By automatic segmentation algorithm, four homogenous objects are detected from the real image and colored with different colors as shown in FIG. 4, wherein the white object represents an illuminant object. FIG. 5 is the binary illuminant object plane which will be analyzed so that objects of vehicle lights could be correctly obtained.

Illuminant object classification and demarcation procedure is carried out for the pixels of the binary illuminant object plane. In this object classification and demarcation procedure, firstly connected object analysis is used to generalize and assembly the correlated spatial characteristics between nighttime illuminant objects.

With regard to the illuminant object obtained by the bright illuminant object segmentation, connected-component labeling must be used to mark-up the neighboring pixels as the same object. The high speed connected-component labeling as applied by the present invention is the use of a scanning method, and all connected-components are labeled on the binary converted image obtained after the segmentation. The present invention mainly adopted high speed connected object labeling algorithm, and the scanning direction is from the top to the bottom and from the left to the right. The scanning method is advantageous in that two types of scanning including coarse scanning and refined scanning are needed. In the coarse scanning, a connected component is probably divided into several parts, and labels of equal value will be added to the portion which is determined as a connected component. For labels of equal value, refined scanning is used to determine the final label of the connected-component. After recording the sub-area of each connected-component, the identification of a vehicle object is done on the basis of the sub-area assembling analysis which will be explained later.

Denotations of connected-components used in the process of sub-area assembling and vehicle object identification are defined as follows:
1. $B_i$ is the $i^{th}$ connected-component sub-area labeled by utilizing a connected-component labeling program;
2. the top edge, bottom edge, right side and left side are represented by $t(B_i)$, $b(B_i)$, $r(B_i)$, $l(B_i)$ respectively;
3. the width and height of the connected-component sub-area, Bi are represented by $W(B_i)$ and $H(B_i)$ respectively;
4. the shortest distance of the horizontal on the perpendicular of the sub-area of two connected-components $B_i$ and $B_j$ are calculated through the following formula;
Horizontal Distance Measurement:

$$D_h(B_i,B_j)=\max[l(B_i),l(B_j)]-\min[r(B_i),r(B_j)] \quad (14)$$

Perpendicular Distance Measurement:

$$D_v(B_i,B_j)=\max[t(B_i),t(B_j)]-\min[b(B_i),b(B_j)] \quad (15)$$

Figure 6:
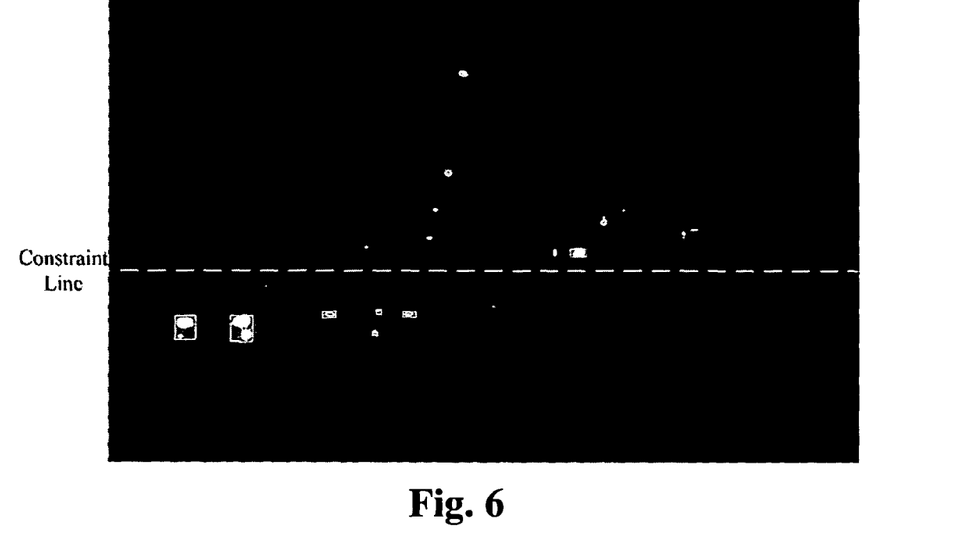
FIG. 6 shows the image of the connected-components of illuminant objects wherein the imaginary horizon line is set up.

5. the overlapping ratio of the perpendicular projection of the sub-area of two connected-components can be obtained through the following formula:

$$P_v(B_i,B_j)=-D_v(B_i,B_j)/\min[H(B_i),H(B_j)] \quad (16)$$

due to illuminant object plane obtained from previous bight object capturing procedure, the illuminant object other than vehicle light object (such as streetlights, traffic lights and neon lights) is usually located at a higher location in the field of view. In order to eliminate the illuminant object other than the vehicle light in advance and speed up the process, an imaginary horizon line is set up as shown in FIG. 6. The imaginary horizon line is configured to one third of the acquired image area. The imaginary horizon line is approximately coincident with the horizon. If an illuminant object is located on the road below imaginary horizon line, the illuminant object is often determined as a vehicle light. Therefore, the processing efficiency is greatly increased.

After obtaining the spatial characteristic information of the connected-components of all illuminant objects, the bright object with similar characteristics are paired and assembled by object assembling procedure so as to find out the vehicle light.

All sub-areas are scanned in this procedure. Several rules for determination are adopted to determine the connected object sub-areas in pairs. Whether the connected object sub-areas in pairs comprise characteristic which is in conformity with arrangement of the vehicle lights. If the connected object sub-areas are horizontally aligned with each other and of a similar size, the connected object sub-areas would be vehicle lights. If two connected object sub-areas are horizontally aligned with each other and of a similar size, then the two connected object sub-area are generalized into one group.

1. The horizontal distance of the two adjacent illuminant objects must lie within a reasonable range:

$$D_h(B_{k1},B_{k2}) < 1.5 \times \max(H(B_{k1}),(B_{k2}) \quad (17)$$

2. The perpendicular projection overlap ratio of the two adjacent illuminant objects have to be in conformity with the following condition, so as to determine whether the two illuminant objects have characteristics of horizontal leveling:

$$P_y(B_1,B_2) > 0.8 \quad (18)$$

3. The height of the two illuminant objects must be similar:

$$H(B_s)/H(B_l) > 0.7 \quad (19)$$

Figure 7:
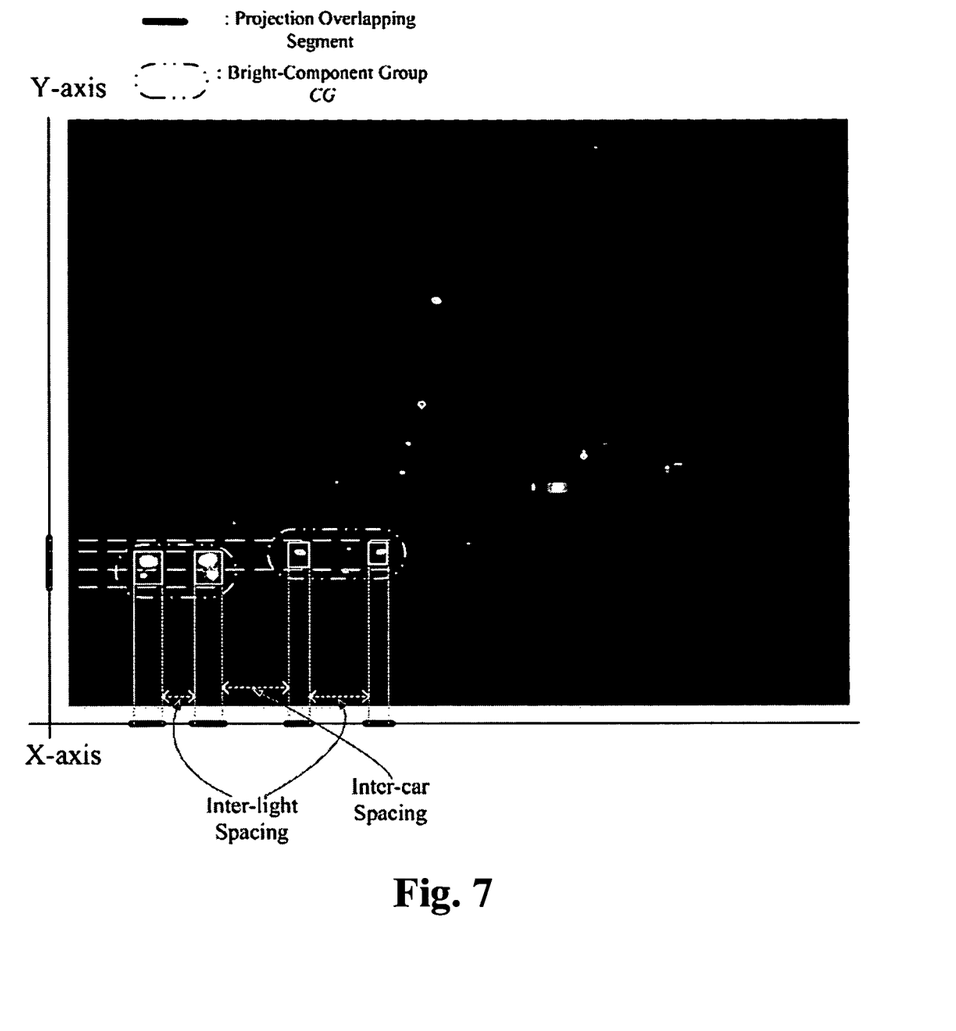
FIG. 7 shows the image of illuminant objects after assembling procedure

If connected objects conform with the above conditions (17)~(19), the object sub-areas are merged into a sub-area group, representing an illuminant object group having similar characteristics. This object assembling result is shown in FIG. 7. As can be seen in the object assembling result, the lights on the oncoming vehicle on the left are generalized into the same group, while the lights of the preceding vehicle on the same lane on the right are assembled into another object group.

Illuminant object groups can be obtained through the vehicle lighting assembling procedure. Then, the object groups having characteristics of vehicle lights are determined as headlamps or tail lamps based on the vehicle lighting object identification and positioning procedure.

In order to determine whether an object group is in conformity with the characteristics of vehicle lights and whether an object group is headlamps or tail lamps, the following rules for determination are used:

1. The aspect ratio conforms to the condition of W/H≧2.0. Vehicle lights are disposed on the front end of the vehicle at both sides and configure a rectangular pattern, so whether the object has rectangular characteristics is determined based on the aspect ratio.
2. By means of Depth of field-Area determining table (Z-A Table), whether the correspondence of the width and depth of field of each object is in conformity with the determination principle of Z-A Table is determined. Z-A Table is made in statistical manner. A certain depth of field corresponds to an orthographically projected area of the front side of the vehicle within a reasonable range, whereby determining whether the object is a vehicle light.
3. A moving direction of a vehicle can be determined depending on determination of headlamps of an oncoming vehicle or tail lamps of a preceding vehicle. In the light of the fact that tail lamps are always red, the tail lamps can be determined. If the illuminant object group conforms to the following condition, then the illuminant object group is determined as a tail lamp object.

$$R_a - 8 > \text{both } G_a \text{ and } B_a, \quad (20)$$

wherein $R_a$, $G_a$, $B_a$ represent the average value of red R, green G and blue B of the pixels of the illuminant object respectively.

After obtaining each vehicle position represented by vehicle lighting group, real spatial distance and position of a vehicle are determined according to a height of the vehicle in the image in y coordinate axis by means of a perspective imaging based distance estimation rule so as to estimate Z-distance in a virtual coordinate system.

The origin of the virtual coordinate system in the image acquired by a CCD video camera is located at center of the image through camera lens. The X coordinate axis and Y coordinate axis of the virtual coordinate system are corresponding to and parallel to the x coordinate axis and y coordinate axis of the image acquired by the CCD video camera, and the Z coordinate axis for Z distance is perpendicular to the plane formed by X coordinate axis and Y coordinate axis. When a vehicle on the road is located at a distance of Z meters ahead of the host vehicle, the distance of Z meters will be projected on the y coordinate axis of the image acquired by the CCD video camera. Therefore, a perspective imaging based distance estimation model can be applied for converting a y coordinate axis position of the vehicle to be detected in the image into the Z-distance of the distance between the vehicle to be detected and the host vehicle. The conversion operation model is expressed by the following formula:

$$Z = k \cdot \frac{f \cdot H}{y} \quad (21)$$

wherein parameter k is a conversion coefficient for the conversion of pixel unit into millimeter, specifically for the conversion of the image plane coordinate axes obtained by the CCD video camera into the corresponding focal length of the lens on the CCD video camera; parameter h is the height from ground where the CCD video camera is installed; and parameter f is the focal length of the lens of the CCD video camera.

The width W of the detected target vehicle can be converted and calculated by way of the perspective imaging principle based on the above mentioned Z-distance value. The pixel width of the detected target vehicle in the image at time t is represented by w(t), and then the relationship between the pixel width w(t) and Z-distance Z(t) at time t is expressed by the following formula:

$$\frac{W}{w(t)} = \frac{Z(t)}{k \cdot f} \quad (22)$$

$$w(t) = k \cdot \frac{f \cdot w}{Z(t)} \quad (23)$$

wherein the pixel width $w(t) = x_r(t) - x_l(t)$, $x_l(t)$ and $x_r(t)$ respectively represent the location of the pixel coordinates at time t of the left edge (the edge of the left vehicle light) and the right edge (the edge of the right vehicle light) of the detected target vehicle in the image. During a period of time $\Delta t = t_1 - t_0$, the relative velocity v of the host vehicle and a front detected target vehicle can be obtained by the following formula:

$$v = \frac{\Delta Z}{\Delta t} \quad (24)$$

-continued $$= \frac{Z(t_1) - Z(t_0)}{t_1 - t_0}$$

$$= \frac{\frac{k \cdot f \cdot W}{w(t_1)} - \frac{k \cdot f \cdot W}{w(t_0)}}{t_1 - t_0}$$

$$= \frac{k \cdot f \cdot W \cdot \frac{w(t_0) - w(t_1)}{w(t_0) \cdot w(t_1)}}{t_1 - t_0}$$

$$= \frac{Z(t_0) \cdot \frac{w(t_0) - w(t_1)}{w(t_1)}}{\Delta t}$$

Hence, the relative velocity v between the host vehicle and the front detected target vehicle can be obtained by multiplying the Z-distance $Z(t_0)$ detected at time $t_0$ and the rate of change of the width w of the front detected target vehicle $w(t_0) - w(t_1)/w(t_1)$.

Figure 8:
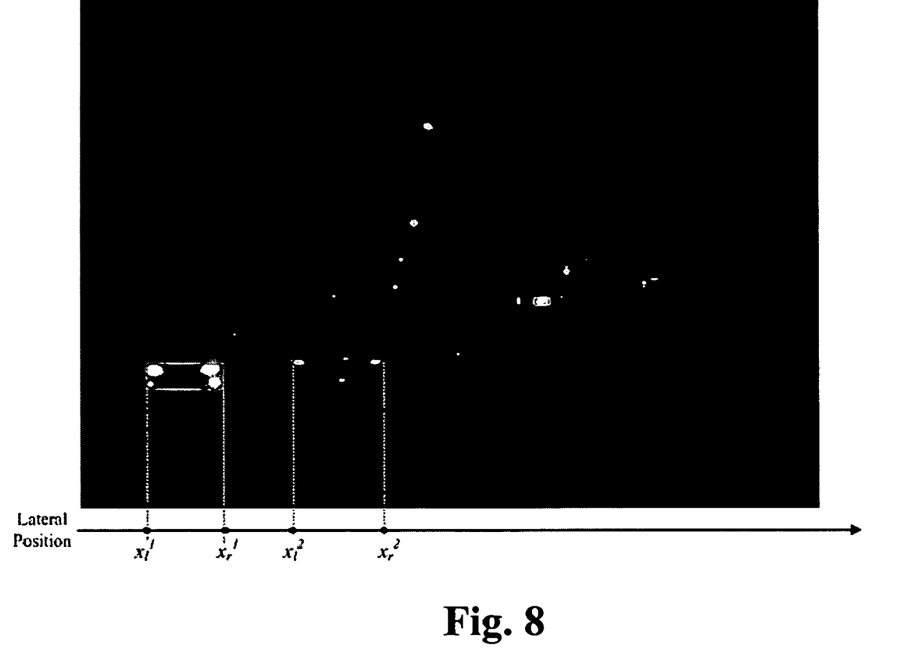
FIG. 8 shows the image in which the left and right edge position of the target vehicle in the pixel coordinate are determined.

By way of the perspective imaging principle, the real relative lateral positions $X_l(t)$ and $X_r(t)$ of the detected target vehicle with respect to the host vehicle can be derived and calculated from the relationship between the pixel coordinate location $x_l(t)$ and $x_r(t)$ (as shown in FIG. 8) of the left edge and the right edge of the detected target vehicle in the image and Z-distance Z(t). It is supposed that at time t, a certain position X(t) at a distance of Z(t) meters from the host vehicle on the lane corresponds to a position x(t) of the pixel coordinate in the image, and the conversion relationship therebetween would be:

$$\frac{X(t)}{x(t)} = \frac{Z(t)}{k \cdot f} \quad (25)$$

$$X(t) = \frac{x(t) \cdot Z(t)}{k \cdot f} \quad (26)$$

The left edge position $X_l(t)$ and the right edge position $X_r(t)$ of the detected target vehicle can be calculated by the following formulas:

$$X_l(t) = \frac{x_l(t) \cdot Z(t)}{k \cdot f} \text{ and } X_r(t) = \frac{x_r(t) \cdot Z(t)}{k \cdot f} \quad (27)$$

By way of the above mentioned mathematical equations, the information including distance, relative velocity and relative lateral positions between the host vehicle and the detected target vehicle on the road can be obtained. As such, the driver can be assisted to obtain the information including relative positions and motion between the host vehicle and the vehicle and to adopt the correct corresponding operations so that traffic accidents at nighttime are prevented from happening. The information may be further used to automatically control vehicle cruise velocity and moving route of a vehicle, so as to increase the safety of nighttime driving.

After the demarcated vehicle light object groups in each continuous image frame are obtained, vehicle light positioning and tracking procedure can be applied for the vehicle light object groups demarcated in each continuous image frame so as to track the moving direction and accurately determine the information of the moving direction, position and relative velocity of each vehicle entering the area under surveillance. The driver can be better assisted to determine the traffic conditions ahead of the host vehicle.

The vehicle light object groups appearing and demarcated in video frames may respectively represent oncoming vehicles on the opposite lane and preceding vehicles on the same lane. After the real relative spatial positions of the detected target vehicle (Z-distance Z(t), left edge position $X_l(t)$ and right edge position $X_r(t)$) are calculated and determined by the above mentioned procedure for the determination of the real vehicle distance and position, the movement path of the vehicle is analyzed in a series of images until the vehicle disappears in the field of view ahead of the host vehicle. A spatial position of a target vehicle i at time t ($t^{th}$ frame of the video image) appearing in front of the host vehicle is represented by $P_i^t$:

$$P_i^t = (X_i(t), Z_i(t)) \quad (28)$$

wherein $X_i(t)$ represents the horizontal midpoint position of the target vehicle i at time t appearing on the lane and can be obtained through the following formula:

$$(X_l(t) + X_r(t))/2 \quad (29)$$

The movement path of each vehicle appearing in each image frame and the information of relative direction of motion, relative position, relative velocity and so on of each vehicle appearing in front of the host vehicle at each time point are calculated and determined by the path coherence function minimization algorithm.

$T_i$ represents a trajectory of a vehicle i which means a movement path formed of spatial positions of the vehicle i at a series of time points 0–t (i.e. the $0^{th}$ to $t^{th}$ image frames) in the space of field of view in front of the host vehicle and is defined as:

$$T_i = <P_i^0, P_i^1, \ldots, P_i^t, \ldots, P_i^n> \quad (30)$$

The $d_i^t$ represents the path deviation of the vehicle i at the $t^{th}$ image frames and defined as:

$$d_i^t = \phi(P_i^{t-1}, P_i^t, P_i^{t+1}) = \phi(\overline{P_i^{t-1}P_i^t}, \overline{P_i^t P_i^{t+1}}) \quad (31)$$

wherein the function $\phi$ is the path coherence function, and the vector $\overline{P_i^{t-1}P_i^t}$ represents the movement vector of the vehicle i from the position $P_i^{t-1}$ to the position $P_i^t$. The path coherence function $\phi$ can be calculated from the relationship between the movement vectors $\overline{P_i^{t-1}P_i^t}$ and $\overline{P_i^t P_i^{t+1}}$. The path coherence function $\phi$ has two main components including the deviation of the movement direction defined by $\overline{P_i^{t-1}P_i^t}$ and $\overline{P_i^t P_i^{t+1}}$ the movement velocity variation. The concept is based on the smoothness by the motion trajectory, and hence the variation of the movement direction and movement velocity shall have smoothness. The function $\phi$ is defined as:

$$\phi(P_i^{t-1}, P_i^t, P_i^{t+1}) = w_1(1 - \cos\theta) + \quad (32)$$

$$w_2 \left[ 1 - 2 \left( \frac{\sqrt{d(P_i^{t-1}, P_i^t) \cdot d(P_i^t, P_i^{t+1})}}{d(P_i^{t-1}, P_i^t) \cdot d(P_i^t, P_i^{t+1})} \right) \right]$$

$$= w_1 \left( 1 - \frac{\overline{P_i^{t-1}P_i^t} \square \overline{P_i^t P_i^{t+1}}}{\|\overline{P_i^{t-1}P_i^t}\| \cdot \|\overline{P_i^t, P_i^{t+1}}\|} \right) +$$

$$w_2 \left[ 1 - 2 \left( \frac{\sqrt{\|\overline{P_i^{t-1}P_i^t}\| \cdot \|\overline{P_i^t, P_i^{t+1}}\|}}{\|\overline{P_i^{t-1}P_i^t}\| + \|\overline{P_i^t, P_i^{t+1}}\|} \right) \right]$$

Hence, the path deviation of the vehicle i is represented by $D_i(T_i)$ and defined as:

$$D_i(T_i) = \sum_{t=2}^{n-1} d_i^t \qquad (33)$$

Furthermore, when m vehicles appears in a video image for a period, the overall trajectory deviation D of the movement trajectory vector of the m vehicles can be calculated by the following formula:

$$D = \sum_{i=1}^{m} D_i \qquad (34)$$

On the basis of the calculated overall trajectory deviation D, multiple vehicle tracking trajectory is optimized by evaluating the minimal overall trajectory deviation, whereby correctly obtaining the information of relative direction of motion, relative position and relative velocity of each vehicle appearing ahead of the host vehicle.

Figure 10:
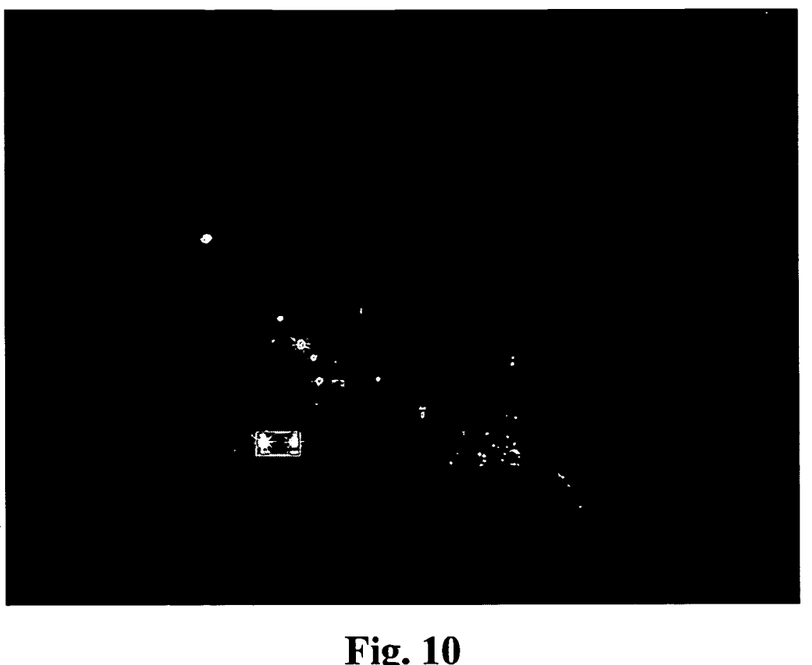
FIG. 10 shows the case of the presence of an oncoming vehicle and a preceding vehicle.
Figure 11:
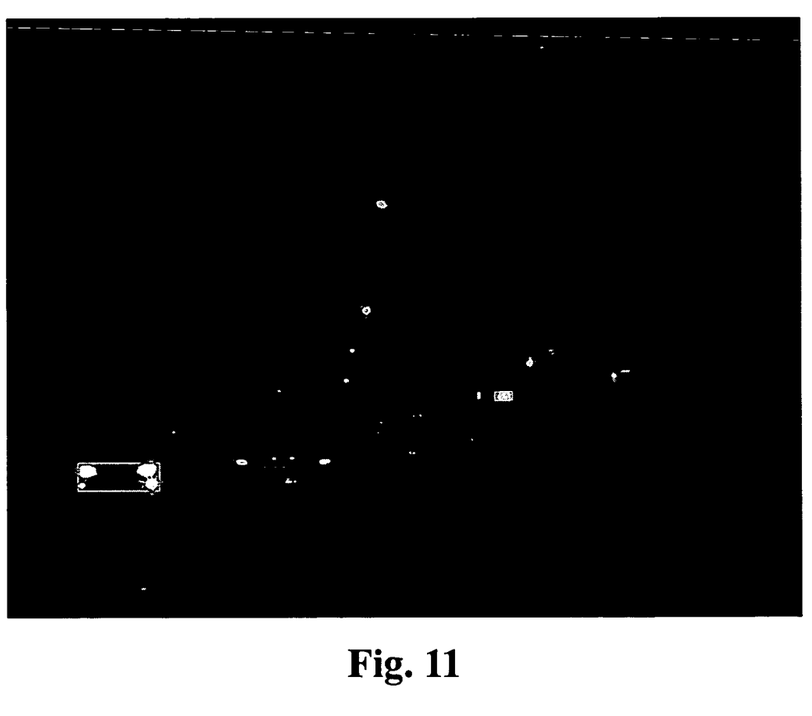
FIG. 11 shows the case of the presence of an oncoming vehicle and a preceding vehicle which are close to each other in the image.
Figure 12:
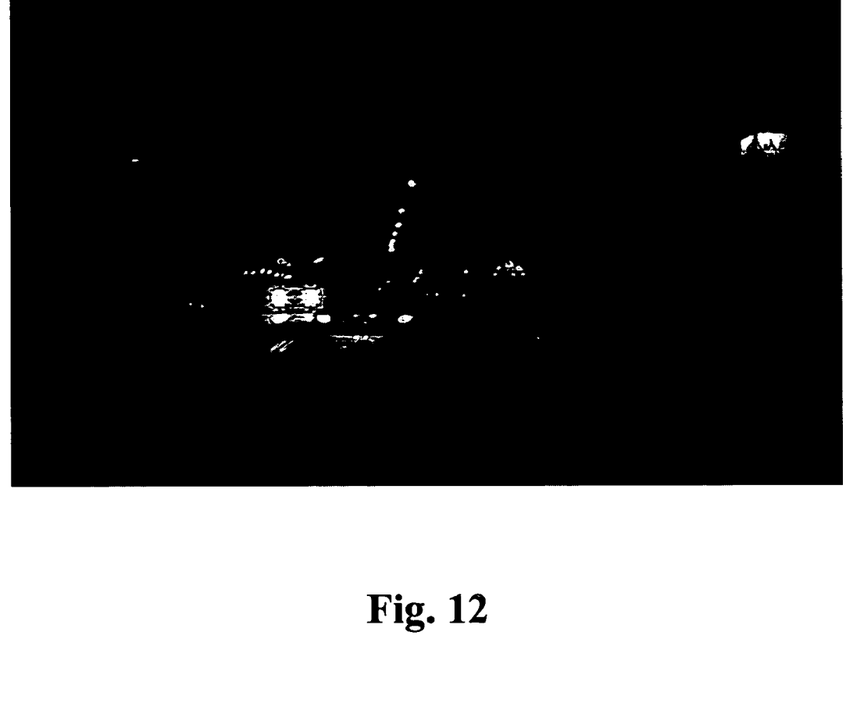
FIG. 12 shows the case of the presence of an oncoming vehicle, a preceding vehicle and lights other than vehicle lights.

The image in front of the vehicle showing the traffic condition which is acquired by the CDD video camera is analyzed by the present system so that the headlamps of the oncoming vehicles and the tail lamps of the preceding vehicle can be detected and identified, and the moving direction of the target vehicle and the distance between the target vehicle and the host vehicle are identified. as shown in FIG. 10, FIG. 11 and FIG. 12.

FIG. 10 shows the case that an oncoming vehicle on the opposite lane on the left is approaching. Even though there are many light sources other than vehicle light in the image, the pair of headlamps of the oncoming vehicle can still be correctly detected. At this time, it is determined by the present system that the distance between the oncoming vehicle and the host vehicle is of 21 meters which is considerably close the actual result obtained by manual distance measurement.

FIG. 11 shows the case that there are a preceding vehicle on the same lane and an oncoming vehicle on the opposite lane at the same time. It can be seen that, the paired headlamps of the oncoming vehicle on the left are correctly identified and demarcated, and the paired tail lamps of the preceding vehicle on the same lane are correctly identified and demarcated. The relative distance between the oncoming vehicle and the host vehicle is estimated to be 9 meters while the relative distance between the preceding vehicle and the host vehicle is estimated to be 11 meters. FIG. 12 shows a complicated case which is difficult to detect. In the image of FIG. 12, the vehicle lights of the two vehicles are considerably close, a series of lights are adjacent to the oncoming vehicle on the left, and a series of streetlights are above the preceding vehicle. Even though there are many illuminant objects disturbing detections, the headlamps of the oncoming vehicle and the paired tail lamps of the preceding vehicle are correctly identified by the system of the present invention so that one vehicle is determined as an oncoming vehicle and the other vehicle is determined as a preceding vehicle. The distance between the oncoming vehicle and the host vehicle is estimated to be 23 meters while the distance between the preceding vehicle and the host vehicle is estimated to be 10 meters.

The identification system of the present embodiment is implemented by a computer device equipped with a CPU Pentium IV 2.4 GHz and a 512 MB memory. The resolution of the video image acquired by the CCD video camera is 720×480. Time for processing each image frame acquired by the CCD video camera is only 16 milliseconds. Hence, with this fast speed processing, the system of the present invention is capable of processing a video with a frame rate of 30 frames per second. Automatic driving and road conditions surveillance functions can be further integrated in the system of the present invention. For example, automatic steering control mechanism, instant video compressing can be added so as to accomplish a more complete driver assisting system.

While the present invention has been described with reference to the preferable embodiment, the present invention is not necessarily limited to the embodiment. For example, the present invention can be applied to the road conditions in a tunnel or in a rainy day. It should be understood that various changes and modifications could be made by a skilled person within the spirit and scope of the inventive concepts described.

What is claimed is:

1. A system for detecting and identifying vehicles in real-time at night-time, the system including:
    an illuminant object image segmentation device for segmenting illuminant objects from images in front of a host vehicle;
    an illuminant object classification device for classifying the illuminant objects segmented from the images by a connected object demarcation unit, so as to extract spatial feature of correlation between the illuminant objects as illuminant object groups;
    a vehicle-light object identification device for extracting spatial feature information of each vehicle from the illuminant object groups by a pattern analyzing unit;
    a vehicle position determining device for gaining relative position information between each target vehicle that appears ahead on the road and the host vehicle from the spatial feature information by a distance estimation unit; and
    a vehicle tracking device for detecting a vehicle's moving direction in accordance with a vehicle-light group targeted from the following continued image frames based on the relative position information after gaining the illuminant object groups, so as to determine a movement information of each vehicle that enters an area under surveillance;
    wherein the pattern analyzing unit identifies whether an illuminant object group has characteristics of vehicle lighting features in accordance with a demarcated illuminant object group based on characteristics of horizontal and vertical projection profiles of illuminant objects with horizontal alignment of illuminant objects, and then identifies the vehicle lighting features in vehicle head lamps or vehicle tail lamps.

2. The system according to claim 1, wherein the relative position information includes a distance of the target vehicle from the lane and its relative positions.

3. The system according to claim 1, wherein the movement information includes relative direction of motion and relative velocity with regard to each of the vehicles.

4. The system according to claim 1, which further includes an automatic control mechanism, using the relative position information and the movement information, to adopt a correct operation corresponding to a cruise velocity of the vehicle and a drive route.

5. The system according to claim 1, wherein the connected object demarcation unit demarcates each of the illuminant objects and analyzes and compares the illuminant objects by utilizing a characteristics of projection analysis, size, ratio and distance of the illuminant objects to obtain a shortest distance of horizontal and vertical sub-area of connected-components of the illuminant objects and an overlapping ratio of a vertical projection of the sub-area of the connected-components.

6. The system according to claim 1, wherein the distance estimation unit estimates a perspective depth of field of target vehicle on the imaginary and real coordinate axes system at a particular timeline on the basis of a perspective image module, and derives a relative spatial position between the target vehicle and the host vehicle on the lane using the corresponding relation between a coordinate position of pixel and the perspective depth of field of the target vehicle in the image.

7. The system according to claim 6, wherein the relative space position includes distance of perspective depth of field, position of left-hand edge and position of right-hand edge.

8. The system according to claim 1, further comprising a switch controller for switching the head lamps of the host vehicle to a high beam or a low beam.

9. A method for detecting and identifying vehicles in real-time at night-time, the method including:
    step of illuminant object image segmentation, segmenting illuminant objects from images in front of a host vehicle;
    step of illuminant object classification, classifying the illuminant objects segmented from the images by a connected object demarcation unit so as to generalize spatial feature correlation between the illuminant objects as illuminant object groups;
    step of vehicle-light object identification, extracting spatial feature information of each vehicle from the illuminant object groups by a pattern analyzing unit;
    step of vehicle position determination, gaining relative position information between each target vehicle that appears ahead on the road and the host vehicle from the spatial feature information by a distance estimation unit; and
    step of vehicle tracking, for detecting a vehicle's moving direction in accordance with a vehicle-light group targeted from each continued image frames based on the relative position information after gaining the illuminant object groups, so as to determine a movement information of each vehicle that enters an area under surveillance wherein the pattern analyzing unit identifies whether an illuminant object group has characteristics of vehicle lighting features in accordance with a demarcated illuminant object group based on characteristics of horizontal and vertical projection profiles of illuminant objects with horizontal alignment of illuminant objects, and then identifies the vehicle lighting features in vehicle head lamps or vehicle tail lamps.

10. The method according to claim 9, wherein the relative position information includes a distance of the target vehicle from the lane and its corresponding positions.

11. The method according to claim 9, wherein the movement information includes relative direction of motion and relative velocity with regard to each of vehicles.

12. The method according to any one of claim 9, which further includes an automatic control mechanism, using the relative position information and the movement information, to adopt a correct operation corresponding to a cruise velocity of the vehicle and a drive route.

13. The method according to claim 9, wherein the connected object demarcation unit demarcates each of the illuminant objects and analyzes and compares the illuminant objects by utilizing the characteristics of projection analysis, size, ratio and distance of the illuminant objects to obtain a shortest distance of horizontal and vertical sub-area of connected-components of the illuminant objects and an overlapping ratio of a vertical projection of the sub-area of the connected-components.

14. The method according to claim 9, wherein further comprises a switch controller of high beam and low beam of the vehicle's head light.

15. The method according to claim 9, wherein the distance estimation unit estimates a perspective depth of field of target vehicle on the imaginary and real coordinate axes system at a particular timeline on the basis of a perspective image module, and derives a relative spatial position between the target vehicle and the host vehicle on the lane using the corresponding relation between a coordinate position of pixel and the perspective depth of field of the target vehicle in the image.

16. The method according to claim 9, wherein the relative space position includes distance of perspective depth of field, position of left-hand edge and position of right-hand edge.

* * * * *